(12) United States Patent
Sakurai

(10) Patent No.: US 8,503,011 B2
(45) Date of Patent: Aug. 6, 2013

(54) PRINTING CONTROL APPARATUS, PRINTING CONTROL METHOD, AND STORAGE MEDIUM FOR USE IN PRINTING USING A HOT FOLDER

(75) Inventor: Masakatsu Sakurai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 808 days.

(21) Appl. No.: 12/580,784

(22) Filed: Oct. 16, 2009

(65) Prior Publication Data

US 2010/0097647 A1    Apr. 22, 2010

(30) Foreign Application Priority Data

Oct. 22, 2008 (JP) ................................. 2008-272282

(51) Int. Cl.
*G06F 3/12* (2006.01)
(52) U.S. Cl.
USPC ........................................ 358/1.15; 358/1.13
(58) Field of Classification Search
USPC .................. 707/1; 705/1; 358/1.13
See application file for complete search history.

(56) References Cited

U.S. PATENT DOCUMENTS

| 2004/0190057 A1* | 9/2004 | Takahashi et al. ........... 358/1.15 |
| 2005/0134882 A1* | 6/2005 | Horii et al. .................... 358/1.11 |
| 2006/0026121 A1* | 2/2006 | Terao ................................ 707/1 |
| 2006/0181728 A1* | 8/2006 | Mori ............................ 358/1.15 |
| 2007/0136087 A1* | 6/2007 | Yamaguchi ....................... 705/1 |
| 2008/0058012 A1* | 3/2008 | Ookuma ........................ 455/557 |
| 2008/0063423 A1* | 3/2008 | Matoba ........................ 358/1.15 |
| 2008/0174817 A1* | 7/2008 | Nemoto et al. ............. 358/1.15 |

FOREIGN PATENT DOCUMENTS

| JP | 2000-118095 A | 4/2000 |
| JP | 2005-216201 A | 8/2005 |

\* cited by examiner

*Primary Examiner* — Twyler Haskins
*Assistant Examiner* — Nicholas Pachol
(74) *Attorney, Agent, or Firm* — Canon U.S.A., Inc. IP Division

(57) ABSTRACT

When input print data is data for normal printing, a hot folder control manager changes information on the property rights of the print data to a holder to whom a quota of a shared folder is not set (holder on whom use limit is not imposed). Then, the hot folder control manager moves print data changing information on the property rights to a normal printing hot folder.

3 Claims, 9 Drawing Sheets

PRINTING CONTROL APPARATUS, PRINTING CONTROL METHOD, AND STORAGE MEDIUM FOR USE IN PRINTING USING A HOT FOLDER

BACKGROUND OF THE INVENTION

1. Field of the Invention

The present invention relates to a printing control apparatus, a printing control method, and a computer program for executing printing processing using a hot folder.

2. Description of the Related Art

Direct printing using a hot folder is suitable for routine printing work, which is periodically printed, or repeated printing such as reprinting. In this direct printing, in printing, a user drags and drops a file intended to print on a designated hot folder. Then, based on output settings set to a hot folder in advance, printing of a file is executed. As described above, in direct printing, printing can easily be executed.

FIG. 9 illustrates an outline of a conventional printing system via a hot folder. FIG. 9 illustrates an example for inputting print data 911 that is input according to an instruction of a user A to desired hot folders 902 to 904 in a shared folder 913 to which a quota for each user has been set.

A quota is an upper limit of "hard disk capacity" allocated for each user in a computer, which is shared by a plurality of users, and also referred to as a disk quota. Further, setting a quota is to set its upper limit value.

Japanese Patent Application Laid-Open No. 2000-118095 discusses the following technique. First, a hot folder monitoring program 901 periodically monitors the respective hot folders 902 to 904 in the shared folder 913. When print data is input to any of hot folders, print data is processed according to printing settings (synonymous with above-described output settings) set to a hot folder to which the print data has been input and the print data is transferred to a device 905. Also when print data 912 input by an instruction of a user B (another user) is processed, similar processing is executed.

Further, a technique is discussed, which provides the front step of a hot folder with a hot folder integration application. More specifically, in Japanese Patent Application Laid-Open No. 2005-216201, first, when a file is introduced into an integration application by drag and drop operation or the like, introduced file information is acquired. Then, the type of a file is analyzed from the acquired file information to introduce a file into a hot folder corresponding to the analyzed type.

However, a hot folder is normally set in a shared server. Thus, as described above, a disk quota is often provided for each user so that a large amount of disks is not consumed by specific persons for the purpose of reprinting and reservation printing.

In normal printing, after print data is input in a hot folder, printing processing is executed at once. Then, after printing is completed, the input print data is deleted at once. Thus, in normal printing, a disk is not consumed for a long period of time.

On the other hand, in reprinting, after data is input in a hot folder, printing processing is executed at once. However, in order to allow printing again, the input print data is not deleted at once but print data is held in a disk for a predetermined time period.

Further, in reservation printing (referred to as confidential printing or confidential print), print output is not executed at once by printing operation from a host personal computer (PC) but printing processing is executed after authentication using a password, a card or the like is executed by panel operation of a printing apparatus. Then, when the printing operation is completed, the input print data is deleted.

Thus, in reprinting and reservation printing, print data needs to be temporarily held in a shared folder for a long period of time compared with normal printing (until data deletion processing is executed). Accordingly, during a period of time to hold print data, memory in a disk is consumed.

Further, depending on an operation system (OS), since a quota cannot be set only for each user and volume, in only a particular folder, the limit of a quota may not be cancelled and a size (value) may not be changed. Furthermore, depending on an OS, when a file is copied or shifted, the property rights of a file may be replaced by a user who has operated it.

Accordingly, when there is little capacity of a quota left, despite the purpose of normal printing (despite the use of a hot folder as a temporary memory for inputting data which is not reprinting or reservation printing), input processing cannot be executed and thus printing can not be executed.

SUMMARY OF THE INVENTION

The present invention is directed to a printing control apparatus which can execute normal printing using a hot folder without being limited for a hot folder.

According to an aspect of the present invention, a printing control apparatus, which inputs data to one of a plurality of hot folders stored in a storage area on which a use limit is imposed, configured to execute printing processing based on the data includes a detection unit configured to detect input of the data into a virtual hot folder on which a use limit is not imposed, a determination unit configured to determine whether to execute normal printing processing, which starts printing processing based on the data when the detection unit detects input of data to the virtual hot folder, and deletes the data from the hot folder when the printing processing is completed, a change unit configured to change information concerning the use limit of data that is input in the virtual hot folder to information on which the use limit is not imposed when the determination unit determines that the normal printing processing is to be executed, and an input unit configured to input data whose information is changed by the change unit to a normal printing hot folder among the plurality of hot folders.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Referring to drawings, a first exemplary embodiment of the present invention will be described below. The details will be described below. A printing system in the present exemplary embodiment uses a hot folder to which a quota has been set. A plurality of users performs printing using a shared hot folder.

The printing system includes an information processing apparatus (hereinafter, referred to as "server") such as a server, which stores a file to be shared by a plurality of users in a shared folder or the like, and software, which operates on a server. Further, the printing system includes an information processing apparatus (hereinafter, referred to as "host personal computer (PC)") such as a personal computer distributed on a network and software, which operates on the host PC.

Furthermore, the printing system includes an image forming apparatus (hereinafter, referred to as "device") such as a multifunction peripheral (MFP), a copying machine and a printer, and software, which operates on the image forming apparatus. This software mutually cooperates to execute processing.

Figure 1:
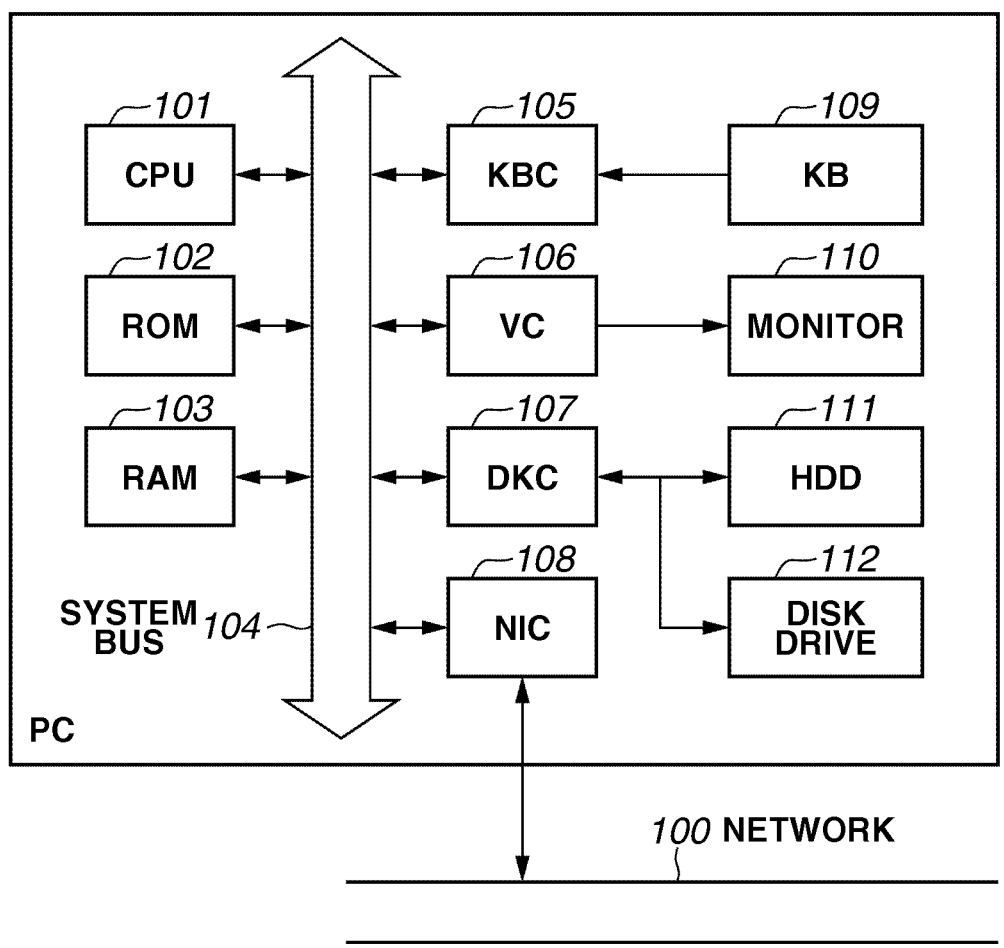
FIG. 1 is a block diagram illustrating an example configuration of hardware of a server and a host PC.

FIG. 1 is a block diagram illustrating an example configuration of hardware of a server and a host PC.

A central processing unit (CPU) 101 uses a random access memory (RAM) 103 as a work memory. The CPU 101 executes a program stored in a read only memory (ROM) 102 and a hard disk drive (HDD) 111. The CPU 101 controls respective configurations, which will be described below, via a system bus 104. The CPU 101 also executes printing processing, which will be described below.

The HDD 111 stores various kinds of programs including an operating system (OS) and printing processing software, and data. The printing processing software is supplied by, for example, a storage medium such as a compact disc read only memory (CD-ROM) capable of mounting on a disk drive 112. The CPU 101 accesses the HDD 111 and the disk drive 112 via a disk controller (DKC) to install printing processing software or the like in the HDD 111.

The CPU 101 displays a user interface (UI) on a monitor 110 via a video card (VC) 106 according to a program. A user operates a pointing device such as a keyboard (KB) and a mouse to perform instructions and input to the UI. The CPU 101 receives the instructions and the input from the user via a keyboard controller (KBC) 105 to execute various kinds of processing in response to the instructions and the input from the user.

Further, the CPU 101 can communicate with other external apparatuses (such as host PC, server, printer, and copying machine) connected to a network 100 such as a local area network (LAN) and the Internet via a network interface card (NIC) 108.

Figure 2:
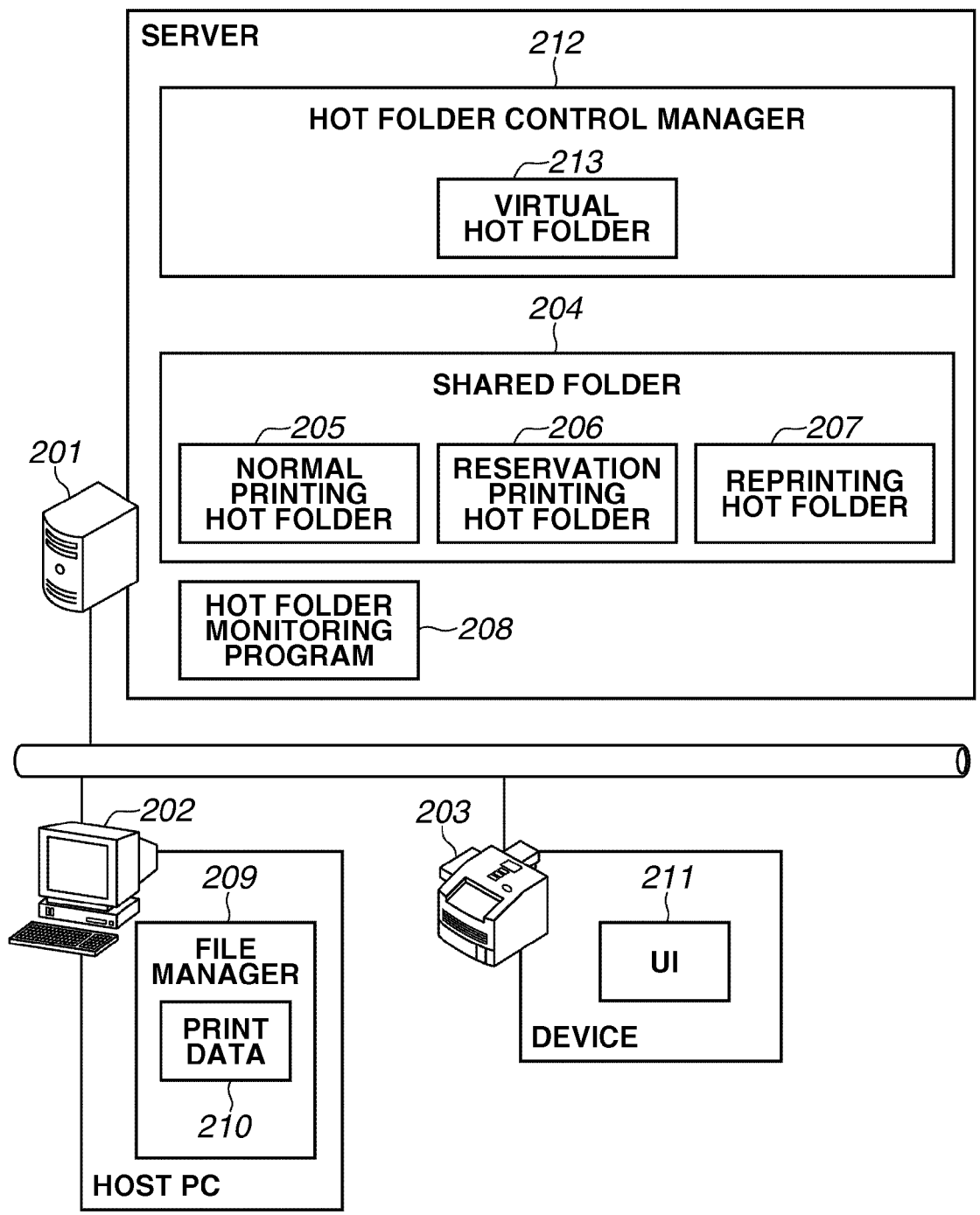
FIG. 2 conceptually illustrates an example configuration of a printing system.

FIG. 2 conceptually illustrates an example configuration of a printing system.

In FIG. 2, a server 201 is a PC including a configuration illustrated in FIG. 1 and is a server for executing printing processing. On the server 201, application software operates. The server 201 includes a hot folder control manager 212, which executes provision of a user interface for inputting print data (data for printing).

The hot folder control manager 212 includes a virtual hot folder 213. The virtual hot folder 213 provides an entrance for inputting print data to hot folders 205 to 207. The hot folder control manager 212 receives input of print data to the virtual hot folder 213. The hot folder control manager 212 controls which hot folder to be used to execute printing processing. The hot folders 205 to 207 may be reread to a second hot folder and the virtual hot folder 213 may be reread to a first hot folder.

Further, the server 201 includes a shared folder 204, a normal printing hot folder 205, a reservation printing hot folder 206, a reprinting hot folder 207, and a hot folder monitoring program 208.

The shared folder 204 is a folder (storage area) for inputting print data. A quota is set in the shared folder 204 for each user. Files in the shared folder 204 are shared by users.

The shared folder 204 includes the normal printing hot folder 205. Print data input in this normal printing hot folder 205 is subjected to printing processing according to normal printing settings set in advance. When the printing processing is completed, the print data in the normal printing hot folder 205 is deleted.

The normal printing refers to printing in which printing processing to print data is performed, when printing data is input in the normal printing hot folder 205, and print data input in the normal printing hot folder 205 is deleted, when the printing processing is completed.

Further, the shared folder 204 includes the reservation printing hot folder 206. The printing processing of the print data input in this reservation printing hot folder 206 is not started immediately and waits for instructions of printing start from a UI 211 of a device 203, which will be described later.

When printing instructions are output, printing processing of print data stored in the reservation printing hot folder 206 is executed. When the printing processing is completed, the print data in the reservation printing hot folder 206 is deleted.

Furthermore, the shared folder 204 includes the reprinting hot folder 207. The print data input in this reprinting hot folder 207 is not deleted after the printing processing is completed and held in the reprinting hot folder 207 for reprinting. This print data is deleted by explicit instructions by a user or according to a predetermined rule.

The hot folder monitoring program 208 monitors the respective hot folders 205 to 207. When print data is input in a hot folder, the hot folder monitoring program 208 executes processing of the print data according to printing settings set in advance to a hot folder in which the print data has been input. Then, the hot folder monitoring program 208 executes processing for transmitting the print data to the device 203.

A host PC 202 includes a configuration illustrated in FIG. 1 and can be operated by a user. The host PC 202 includes a file manager 209. The file manager 209 give an instruction to input print data in any one of the hot folders 205 to 207 in the server 201. The file manager 209 stores print data 210, which is input to any one of the hot folders 205 to 207.

The device 203 includes a scanner function, a printer function, and a facsimile function in addition to a copying function. The device 203 includes the UI 211. The UI 211 is a user interface, which is provided on an operation panel for directly operating the device 203 when a user uses a copying function, a facsimile function or the like of the device 203. Further, the UI 211 is a user interface to be also used in order that a user instructs printing during reservation printing.

Figure 3:
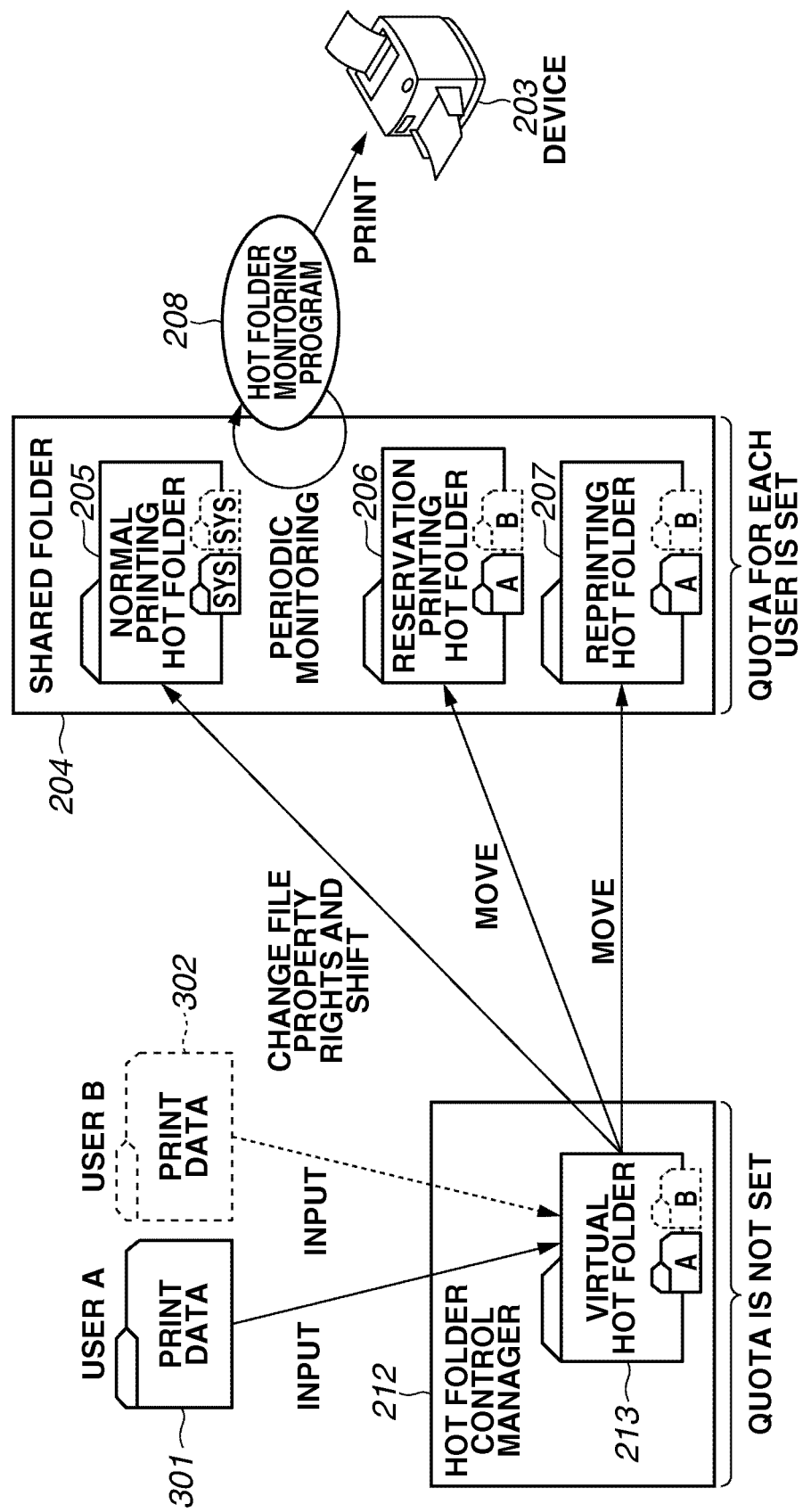
FIG. 3 conceptually illustrates one example of processing of a printing system via a hot folder.

FIG. 3 conceptually illustrates example processing of a printing system printing via a hot folder.

Figure 9:
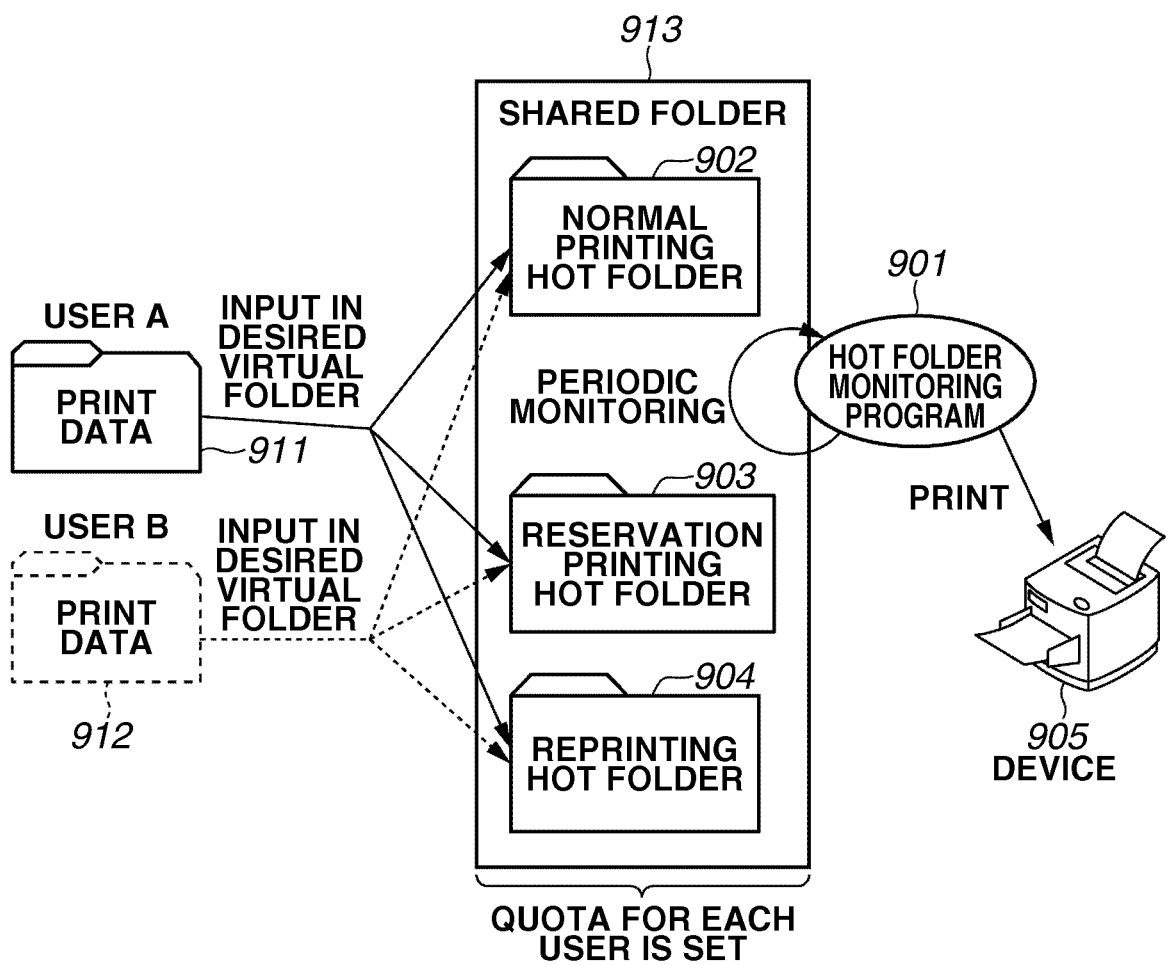
FIG. 9 illustrates an outline of a printing system printing via a hot folder.

When a user A instructs to input print data into a hot folder, conventionally, as illustrated in FIG. 9, the print data has directly been input into a desired hot folder of the shared folder 913.

In contrast to this, in the present exemplary embodiment, the hot folder control manager 212 inputs print data 301 into the virtual hot folder 213 to be provided as a user interface. In this virtual hot folder 213, there is no limit by a quota. On the other hand, in the shared folder 204 including the hot folders 205 to 207, a quota is set for each user.

When the print data 301 is input, the hot folder control manager 212 analyzes the input print data 301. Based on the analyzed result, the hot folder control manager 212 determines whether the print data 301 is input for normal printing, reservation printing or reprinting.

When the input print data 301 is used for normal printing, the hot folder control manager 212 changes the property rights of a file of the input print data 301 to a system, or a user to whom a quota is not set, or a manager. Then the hot folder control manager 212 moves the input print data 301 to the normal printing hot folder 205.

On the other hand, when the input print data 301 is not for normal printing and is, for example, for reservation printing or reprinting, the hot folder control manager 212 moves a file of the input print data 301 into the desired hot folders 206 or 207 as it is.

The hot folder monitoring program 208 periodically monitors the respective hot holders 205 to 207 in the shared folder 204. When the print data 301 is input into any of the hot folders 205 to 207, the hot folder monitoring program 208 processes the print data according to printing settings set to a hot folder to which the print data 301 is input. Then, the hot folder monitoring program 208 executes processing for transferring print data to the device 203.

Further, also when a user B (another user) other than the user A executes processing for inputting print data 302 into the virtual hot folder 213, the hot folder monitoring program 208 executes similar processing to the processing for the print data 301.

Figure 4:
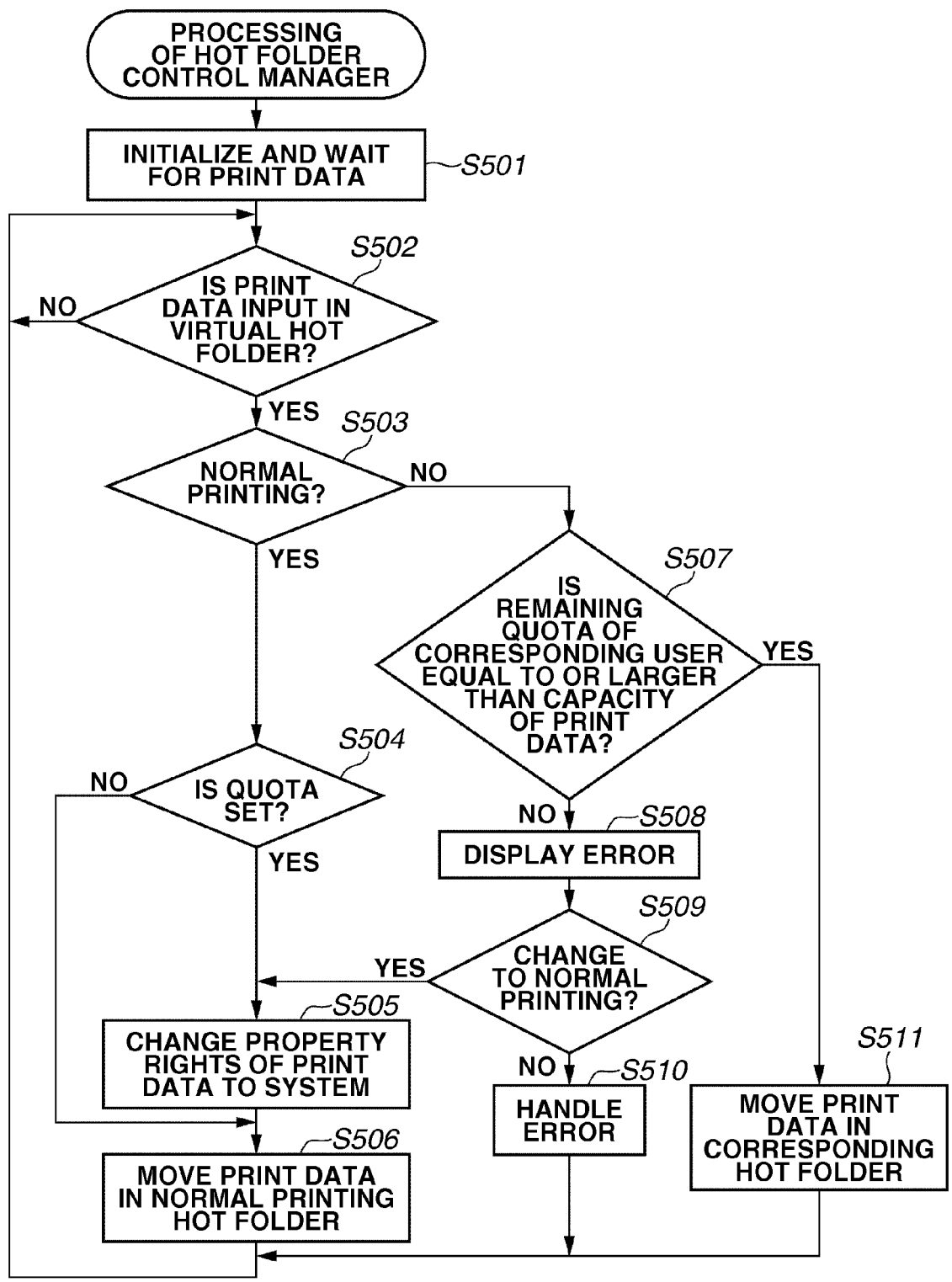
FIG. 4 is a flowchart illustrating example processing in a hot folder control manager.

FIG. 4 is a flowchart illustrating example processing in the hot folder control manager 212. Each step of the flowchart in the present exemplary embodiment is executed by causing the CPU 101 to read and operate a program for realizing the present invention stored in a ROM or the like.

When the hot folder control manager 212 is started, first, in step S501, the hot folder control manager 212 executes initialization processing of memories and settings and results in the wait condition of print data.

Next, in step S502, the hot folder control manager 212 determines whether print data is input into the virtual hot folder 213. As the result of this determination, when print data is not input into the virtual hot folder 213 (No in step S502), the determination in step S502 is continued. As described above, in the present exemplary embodiment, for example, by executing the processing in step S502, an example of a detection unit is realized.

On the other hand, when print data is input into the virtual hot folder 213 (Yes in step S502), the processing proceeds to step S503. In step S503, the hot folder control manager 212 determines whether normal printing is designated to the print data based on the analyzed result of the input print data. As describe above, in the present exemplary embodiment, for example, by executing the processing in step S503, an example of a determination unit is realized.

When normal printing is not designated to the input print data (No in step S503), the processing proceeds to step S507, which will be described later. On the other hand, when normal printing is designated to the input print data (Yes in step S503), the processing proceeds to step S504. In step S504, the hot folder control manager 212 determines whether a quota is set in the shared folder 204.

As described above, in the present exemplary embodiment, for example, a quota is a use limit (usable capacity). By executing the processing in step S504, an example of a second determination unit is realized.

When a quota is not set in the shared folder 204 (No in step S504), step S505 is omitted and then the processing proceeds to step S506, which will be described later. On the other hand, when a quota is set in the shared folder 204 (Yes in step S504), the processing proceeds to step S505.

When the processing proceeds to step S505, the hot folder control manager 212 changes the property rights of the input print data to a system. The destination of the change of the property rights may be any person who is not set to the quota of the shared folder 204. For example, the destination of the change of the property rights may be a user or a manager who is not set to the shared folder 204 as a quota.

As described above, in the present exemplary embodiment, for example, the property rights of print data are an example of information concerning the use limit of a storage medium. Thus, by executing the processing in step S505, an example of a change unit is realized.

Then, when the processing proceeds to step S506, the hot folder control manager 212 moves the input print data into the normal printing hot folder 205. Then the processing returns to step S502. As described above, in the present exemplary embodiment, for example, by executing the processing in step S506, an example of an input unit is realized.

As described above, in step S503, when it is determined that normal printing is not designated to the input print data (No in step S503), the processing proceeds to step S507. In step S507, the hot folder control manager 212 identifies a user who has input the print data based on information on the property rights of print data.

Then, information about the remaining quota for the identified user is acquired from data on the shared folder 204. Then, the hot folder control manager 212 determines whether the acquired remaining quota (capacity) is equal to or larger than the capacity of the input print data. As described above, in the present exemplary embodiment, for example, by executing the processing in step S507, an example of a third determination unit is realized.

If the acquired remaining quota (capacity) is equal to or larger than the capacity of the input print data (Yes in step S507), the processing proceeds to step S511, which will be described later.

On the other hand, if the capacity of the input print data is larger than the capacity of the acquired remaining quota (capacity) (No in step S507), the processing proceeds to step S508. In step S508, the hot folder control manager 212 instructs the host PC 202 to notify the user of an error and select whether printing is switched to normal printing.

Figure 5:
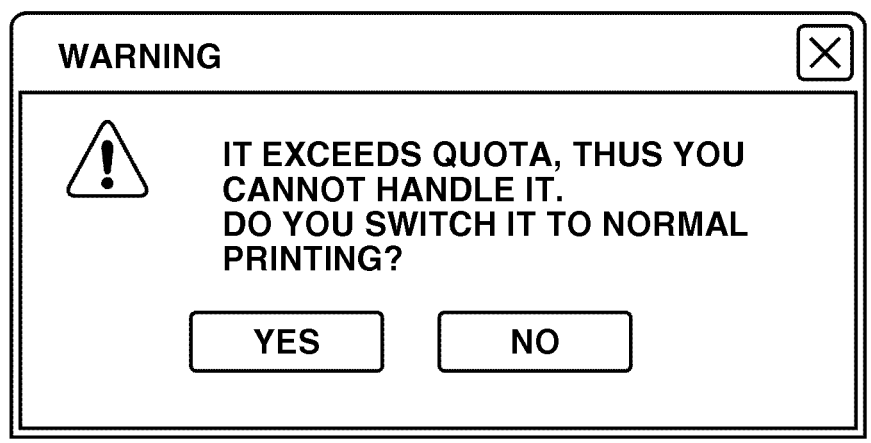
FIG. 5 illustrates an example error display.

The host PC 202 executes display on its monitor 110 according to the instruction. FIG. 5 illustrates an example error display. On a dialog 500 illustrated in FIG. 5, the notification informing that printing by current settings is not possible is displayed, and also a button allowing the user to designate whether a printing method is switched to normal printing is displayed. As described above, in the present exemplary embodiment, for example, by executing processing in step S510, an example notification unit is realized.

Next, in step S509, the hot folder control manager 212 receives data, which indicates the operation contents of the user to the dialog 500, from the host PC 202. Based on the received data, the hot folder control manager 212 determines whether a printing method is switched to normal printing.

As described above, in the present exemplary embodiment, if it is instructed to execute printing other than normal printing, when the printing cannot be continued by a limit caused by a quota, a printing method can be switched to normal printing. Thus, the convenience of printing using a hot folder can be enhanced.

In step S509, when it is determined that a printing method is switched to normal printing (Yes in step S509), the processing proceeds to step S505. On the other hand, when it is determined that a printing method is not switched to normal printing (No in step S509), the processing proceeds to step S510. When the processing proceeds to step S510, the hot folder control manager 212 executes error handling such as cancellation of the input print data and then the processing returns to step S502.

Further, as described above, in step S507, when it has been determined that the acquired remaining quota (capacity) is equal to or larger than the capacity of the input print data (Yes in step S507), the processing proceeds to step S511. When the processing proceeds to step S511, the hot folder control manager 212 moves the input print data into a hot folder specified based on the analyzed result of the input print data. Thereafter, the processing returns to step S502.

As described above, in the present exemplary embodiment, when the input print data 301 (or 302) is provided for normal printing, the hot folder control manager 212 executes the following processing. The hot folder control manager 212 changes information about the property rights of the input print data 301 (or 302) to another person (person on whom use limit is not imposed) to whom the quota of the shared folder 204 is not set.

Then, the hot folder control manager 212 moves print data, of which property rights is changed, to a normal printing hot folder. Thus, a manager sets the use limit by a quota, thereby allowing management of a disk capacity to be executed for each user.

On the other hand, in normal printing, a user who performs printing can continuously perform printing without caring about a quota. Accordingly, a user can perform normal printing using a hot folder without suffering the use limit of a hot folder.

Next, a second exemplary embodiment of the present invention will be described. In the above-described first exemplary embodiment, the virtual hot folder 213 to which print data is input is not a folder, which is provided by a file manager of an OS, but a folder, which is provided by the hot folder control manager 212 (application software). Thus, there is a problem that operability including a user interface is different from normal file operation, which is provided by an OS.

Accordingly, in the present exemplary embodiment, a case in which a file manager of an OS provides a virtual hot folder will be exemplified and described. As described above, the present exemplary embodiment and the above-described first exemplary embodiment are principally different in a part of a configuration and processing associated with a virtual hot folder. Thus, in the description of the present exemplary embodiment, elements and parts, which are identical to those of the above described first exemplary embodiment are designated by identical reference numerals as those designated in FIGS. 1 to 5, and the detail description will be omitted.

Figure 6:
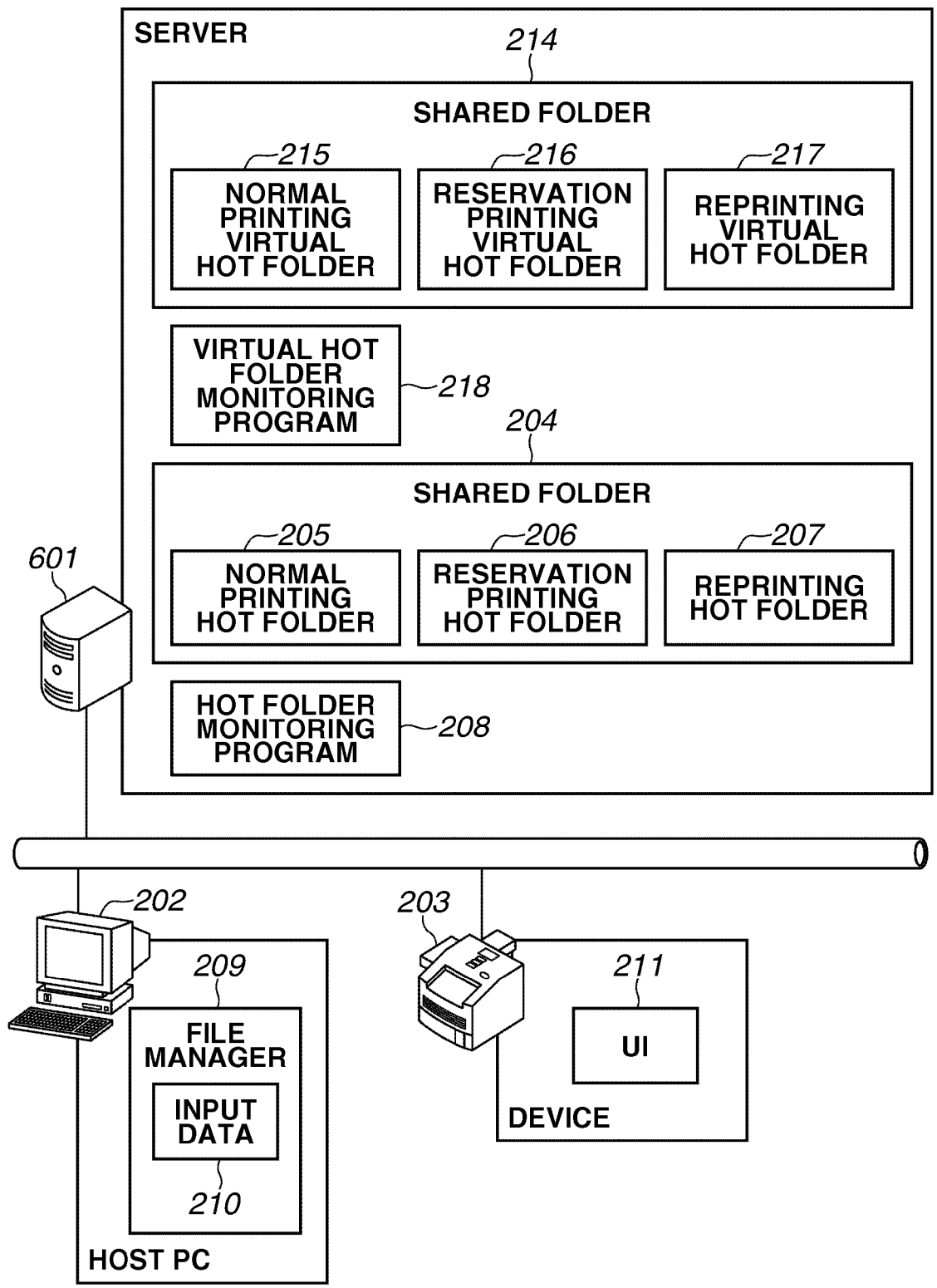
FIG. 6 conceptually illustrates an example configuration of a printing system.

FIG. 6 conceptually illustrates an example configuration of a printing system. In FIG. 6, a server 601 is a PC including a configuration illustrated in FIG. 1 and a server for executing printing processing. Instead of the hot folder control manager 212 illustrated in FIG. 2, the server 601 includes a shared folder 214, a normal printing virtual hot folder 215, a reservation printing virtual hot folder 216, a reprinting virtual hot folder 217, and a virtual hot folder monitoring program 218.

The shared folder 214 is a folder for inputting print data. A quota is not set in the shared folder 214. A File in the shared folder 214 is shared by users.

The shared folder 214 includes the normal printing virtual hot folder 215. Print data input in this normal printing virtual hot folder 215 is moved to the normal printing hot folder 205, which will be described later, after the property rights of the file of its print data is changed to a holder to whom the quota of the shared folder 214 is not set. More specifically, the property rights of the file of the print data are changed to, for example, a system, or a user or a manager to whom a quota is not set.

Further, the shared folder 214 includes the reservation printing virtual hot folder 216. Print data input in this reservation printing virtual hot folder 216 is moved to the reservation printing hot folder 206, which will be described later, without changing the property rights of the file.

Furthermore, the shared folder 214 includes the reprinting virtual hot folder 217. Print data input in this reprinting virtual hot folder 217 is similarly moved to the reprinting hot folder 207 without changing the property rights of the file.

The virtual hot folder monitoring program 218 periodically monitors respective virtual hot folders 215 to 217. When print data is input in a virtual hot folder, the virtual hot folder monitoring program 218 moves the print data to a hot folder corresponding to the shared folder 204 with the property rights of the file changed or unchanged according to a virtual hot folder to which the print data is input.

Figure 7:
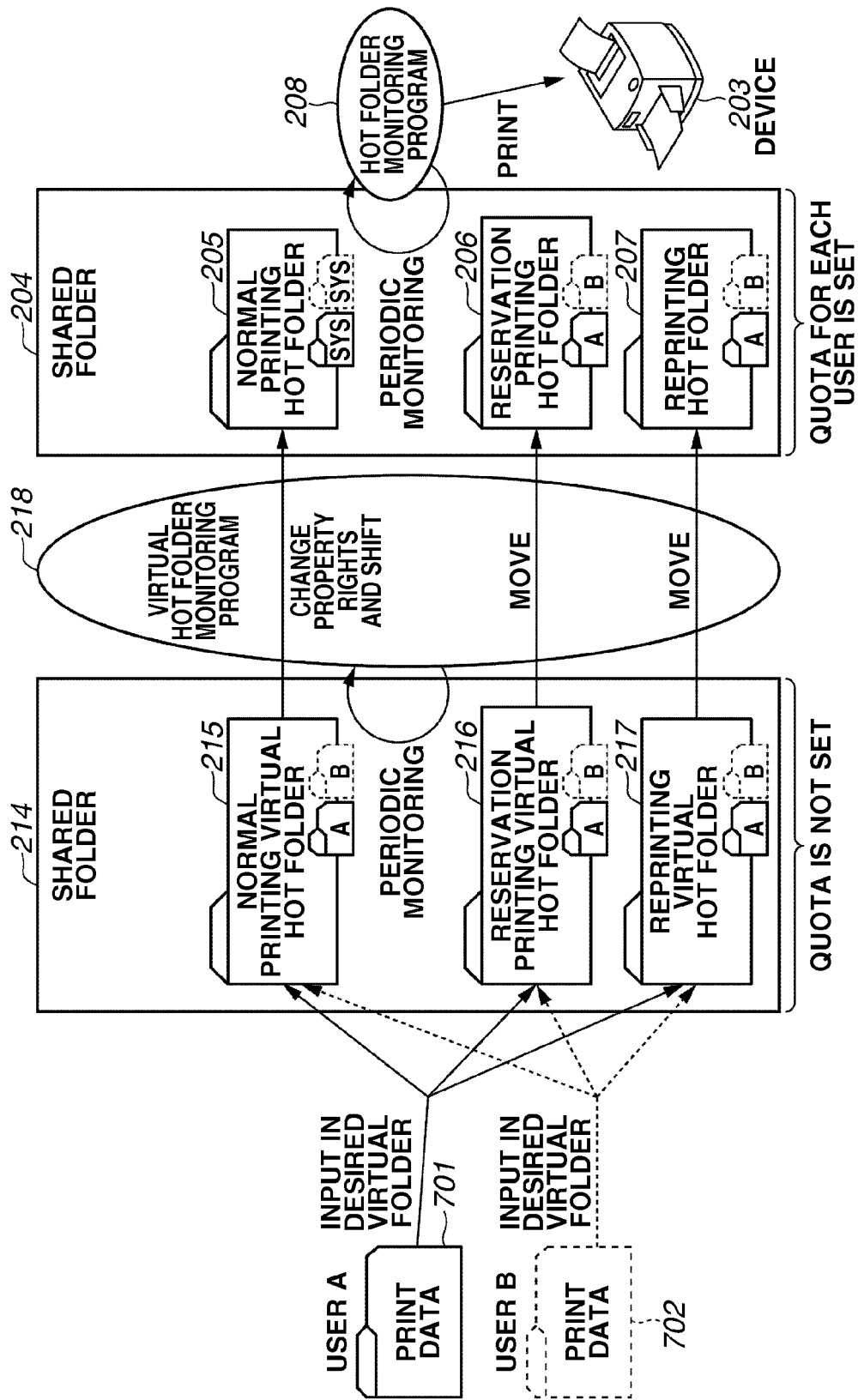
FIG. 7 conceptually illustrates example processing of a printing system via a hot folder.

FIG. 7 conceptually illustrates an example processing of a printing system via a hot folder.

When a user A instructs to input print data in a hot folder, as illustrated in FIG. 9, conventionally, the print data has directly been input in a desired hot folder of the shared folder 913.

On the other hand, in the present exemplary embodiment, print data 701 is input in a virtual hot folder generated in the shared folder 204, for which a quota is not set. The virtual hot folder monitoring program 218 periodically monitors the virtual hot folders 215 to 217 in the shared folder 214. When it is detected that the print data 701 is input in the normal printing virtual hot folder 215, the virtual hot folder monitoring program 218 changes the property rights of the file of the input print data 701 to, for example, a system.

Then, the virtual hot folder monitoring program 218 moves the print data 701 to the normal printing hot folder 205 in the shared folder 204, which includes settings of a quota.

Further, when it is detected that the print data 701 is input in the reservation printing virtual hot folder 216, the virtual hot folder monitoring program 218 moves the print data 701 into the reservation printing hot folder 206 in the shared folder 204, which includes settings of a quota, without changing the property rights of the file of the input print data 701.

Furthermore, when it is detected that the print data 701 is input in the reprinting virtual hot folder 217, the virtual hot folder monitoring program 218 moves the print data 701 to the reprinting hot folder 207 in the shared folder 204, which includes settings of a quota, without changing the property rights of the file of the input print data 701.

The hot folder monitoring program 208 periodically monitors the respective hot folders 205 to 207 in the shared folder 204. When the print data 701 is input in any of the hot folders 205 to 207, the hot folder monitoring program 208 processes the print data 701 according to printing settings set to a hot folder in which the print data 701 has been input and transfer the print data to the device 203.

Further, also when a user B (another user other than a user A) performs processing for inputting print data 702 to a virtual hot folder in the shared folder 214, the similar processing to that performed to the print data 701 is performed.

Figure 8:
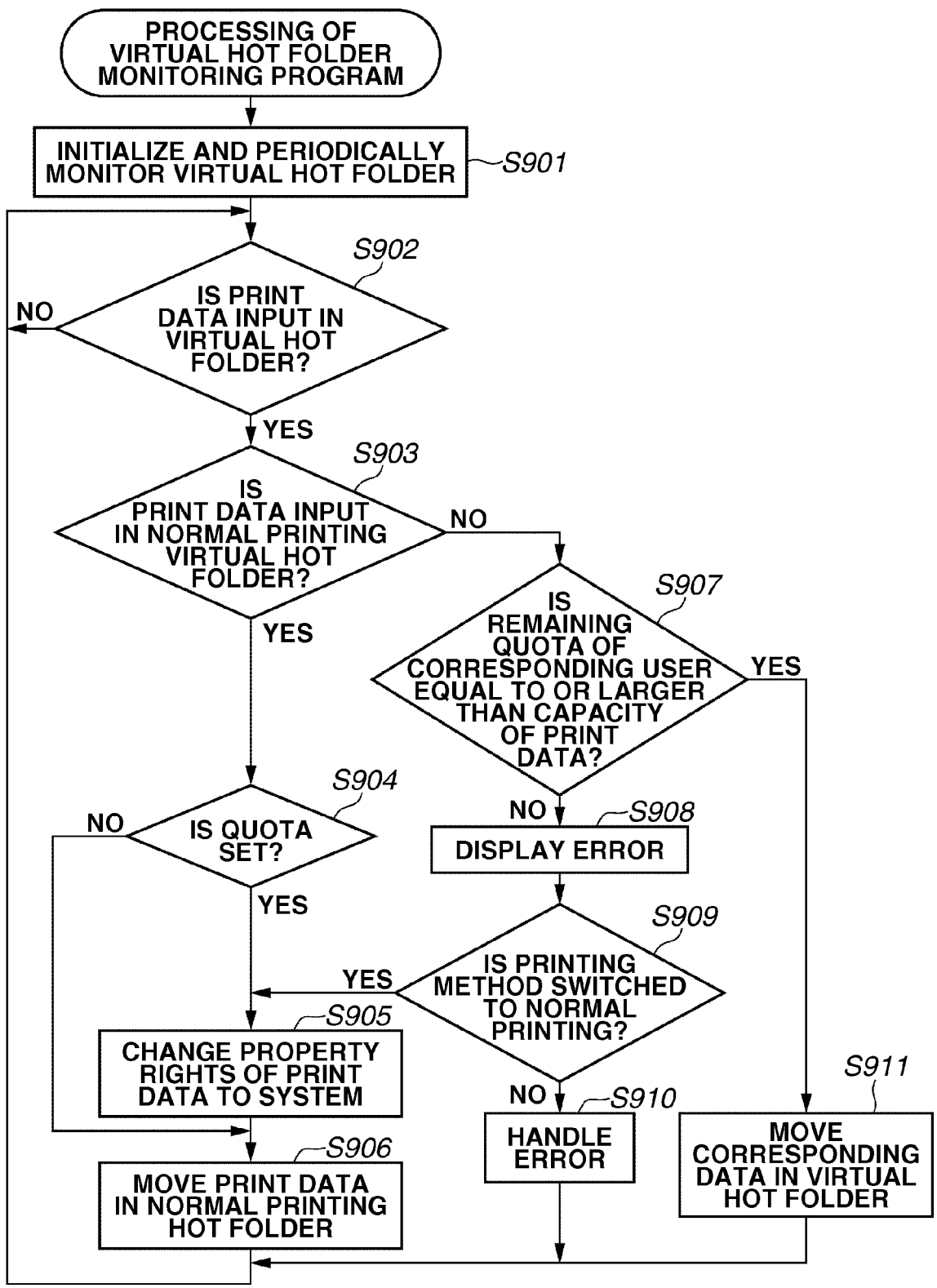
FIG. 8 is a flowchart illustrating example processing in a virtual hot folder monitoring program.

FIG. 8 is a flowchart illustrating example processing in the virtual hot folder monitoring program 218.

When the virtual hot folder monitoring program 218 is started, first, in step S901, the virtual hot folder monitoring program 218 executes initialization processing of memories and settings and start monitoring an input of print data.

Next, in step S902, the virtual hot folder monitoring program 218 periodically determines whether print data has been input in any of the virtual hot folders 215 to 217. As the result of this determination, when print data is not input in a virtual hot folder (No in step S902), the determination in step S902 is continued. As described above, in the present exemplary embodiment, for example, by executing the processing in step S902, an example of a detection unit is realized.

On the other hand, when print data is input in a virtual hot folder (Yes in step S902), the processing proceeds to step S903. When the processing proceeds to step S903, the virtual hot folder monitoring program 218 determines whether print data is input in the normal printing virtual hot folder 215.

When print data is not input in the normal printing virtual hot folder 215 (No in step S903), the processing proceeds to step S907, which will be described later. As described above, in the present exemplary embodiment, for example, by executing the processing in step S903, an example of a determination unit is realized.

On the other hand, when print data is input in the normal printing virtual hot folder 215 (Yes in step S903), the processing proceeds to step S904. In step S904, the virtual hot folder monitoring program 218 determines whether a quota is set to the shared folder 204. As described above, in the present exemplary embodiment, for example, by executing the processing in step S904, an example of a second determination unit is realized.

When a quota is not set to the shared folder 204 (No in step S904), step S905 is omitted and the processing proceeds to step S906, which will be described later. On the other hand, when a quota is set to the shared folder 204 (Yes in step S904), the processing proceeds to step S905.

When the processing proceeds to step S905, the virtual hot folder monitoring program 218 changes the property rights of the input print data to a system. The destination of the change of the property rights may be any person only if the person is a holder whose quota is not set to of the shared folder 204. For example, the destination of the change of the property rights may be a user or a manager whose quota is not set to the shared folder 204.

As described above, in the present exemplary embodiment, for example, by executing the processing in step S905, an example of a change unit is realized.

Then, when the processing proceeds to step S906, the virtual hot folder monitoring program 218 moves the input print data to the normal printing hot folder 205. Then, the processing returns to step S902. As described above, in the present exemplary embodiment, for example, by executing the processing in step S906, an example of an input unit is realized.

As described above, in step S903, when it is determined that print data is not input in the normal printing virtual hot folder 215 (No in step S903), the processing proceeds to step S907.

When the processing proceeds to step S907, the virtual hot folder monitoring program 218 identifies a user who has input the print data based on information on the property rights of print data. Then, information on the remaining quota for the identified user is acquired from data on the shared folder 204.

Then, in step S907, the hot folder control manager 212 determines whether the acquired remaining quota (capacity) is equal to or larger than the capacity of the input print data. As described above, in the present exemplary embodiment, for example, by executing the processing in step S907, an example of a third determination unit is realized.

As the result of this determination, if the acquired remaining quota (capacity) is equal to or larger than the capacity of the input print data (Yes in step S907), the processing proceeds to step S911, which will be described later.

On the other hand, if the capacity of the input print data is larger than the acquired remaining quota (capacity) (No in step S907), the processing proceeds to step S908. In step S908, the virtual hot folder monitoring program 218 instructs the host PC 202 to notify errors and select whether printing is to be switched to normal printing. The host PC 202 executes display on its monitor 110 according to this instruction (refer to FIG. 5). As described above, in the present exemplary embodiment, for example, by executing the processing in step S908, an example of a notification unit is realized.

Next, in step S909, the virtual hot folder monitoring program 218 receives data, which indicates the operation contents of a user to the dialog 500, from the host PC 202. Based on the received data, the virtual hot folder monitoring program 218 determines whether a printing method is switched to normal printing.

When it is determined that a printing method is switched to normal printing (Yes in step S909), the processing proceeds to the above-described step S905. On the other hand, when it is determined that a printing method is not switched to normal printing (No in step S909), the processing proceeds to step S910. When the processing proceeds to step S910, the virtual hot folder monitoring program 218 executes error handling such as cancellation of the input print data and the then processing returns to step S902.

Further, as described above, in step S907, when it is determined that the acquired remaining quota (capacity) is equal to or larger than the capacity of the input print data (Yes in step S907), the processing proceeds to step S911. In step S911, the virtual hot folder monitoring program 218 moves the input print data to the specified hot folder based on the analyzed result of the input print data. Then, the processing returns to step S902.

As described above, in the present exemplary embodiment, the virtual hot folders 215 to 217 are generated as folders to be provided by a file manager of an OS. Thus, print data can be input in a virtual hot folder with operability similar to the operation of other files. Thus, usability can be improved more than that in the first exemplary embodiment.

According to the present invention, a virtual hot folder on which a use limit is not imposed is separately provided other than a hot folder which is stored in a storage area on which a use limit is imposed.

When it is detected that data is input in this virtual hot folder, it is determined whether to execute normal printing processing when the data is input in the virtual hot folder. As the result of this determination, when the normal printing processing is executed, after information concerning the use limit of the data is changed to information on which the use limit is not imposed, the data is input in a hot folder for executing normal printing of the data.

Accordingly, when normal printing is executed, a hot folder can be used without suffering a use limit in a storage area. When other printing is executed, a hot folder can be used within the range of the use limit in a shared folder.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-272282 filed Oct. 22, 2008, which is hereby incorporated by reference herein in its entirety.

What is claimed is:

1. A printing control apparatus configured to have a normal printing hot folder which is used for normal printing processing, which starts printing processing based on data when the data is detected, and deletes the data when the printing processing is completed and another hot folder which is used for another print processing different from the normal printing processing, the printing control apparatus comprising:
   a detection unit configured to detect input of the data;
   a determination unit configured to determine print processing requested by the detected data;
   an identifying unit configured to identify a property right of the detected data when the determination unit determines that the print processing requested by the detected data is the another print processing;
   a capacity determination unit configured to determine whether or not a size of the detected data is equal to or smaller than a remaining capacity of the another hot folder corresponding to the identified property right;
   a print processing determination unit configured to determine whether the another printing processing is changed to the normal print processing, when the capacity determination unit determines that the detected data is larger than the remaining capacity;
   a change unit configured to change the property right for information on which a use limit is not imposed, when the print processing determination unit determines that the another print processing is changed to the normal print processing; and
   an input unit configured to input the detected data to the normal printing hot folder after the property right is changed for the information on which the use limit is not imposed.

2. A printing control method for inputting data to one of a normal printing hot folder which is used for normal printing processing, which starts printing processing based on data when the data is detected, and deletes the data when the printing processing is completed and another hot folder which is used for another print processing different from the normal printing processing, the printing control method comprising:
   detecting input of the data;
   determining print processing requested by the detected data;
   identifying a property right of the detected data when it is determined that the print processing requested by the detected data is the another print processing;
   determining whether or not a size of the detected data is equal to or smaller than a remaining capacity of the another hot folder corresponding to the identified property right;
   determining whether the another printing processing is changed to the normal print processing, when it is determined that the detected data is larger than the remaining capacity;
   changing the property right for information on which a use limit is not imposed, when it is determined that the another print processing is changed to the normal print processing; and
   inputting the detected data to the normal printing hot folder after the property right is changed for the information on which the use limit is not imposed.

3. A non-transitory computer-readable storage medium containing a computer-executable program for causing a computer to perform a printing control method for inputting data to one of a normal printing hot folder which is used for normal printing processing, which starts printing processing based on data when the data is detected, and deletes the data when the printing processing is completed and another hot folder which is used for another print processing different from the normal printing processing, the printing control method comprising:
   detecting input of the data;
   determining print processing requested by the detected data;
   identifying a property right of the detected data when it is determined that the print processing requested by the detected data is the another print processing;
   determining whether or not a size of the detected data is equal to or smaller than a remaining capacity of the another hot folder corresponding to the identified property right;
   determining whether the another printing processing is changed to the normal print processing, when it is determined that the detected data is larger than the remaining capacity;
   changing the property right for information on which a use limit is not imposed, when it is determined that the another print processing is changed to the normal print processing; and
   inputting the detected data to the normal printing hot folder after the property right is changed for the information on which the use limit is not imposed.

* * * * *